INVENTORS
JAY P. WALKER
CLARENCE O. GLASGOW
ALEX W. FRANCIS JR.
BY
Arthur L Wade
ATTORNEY

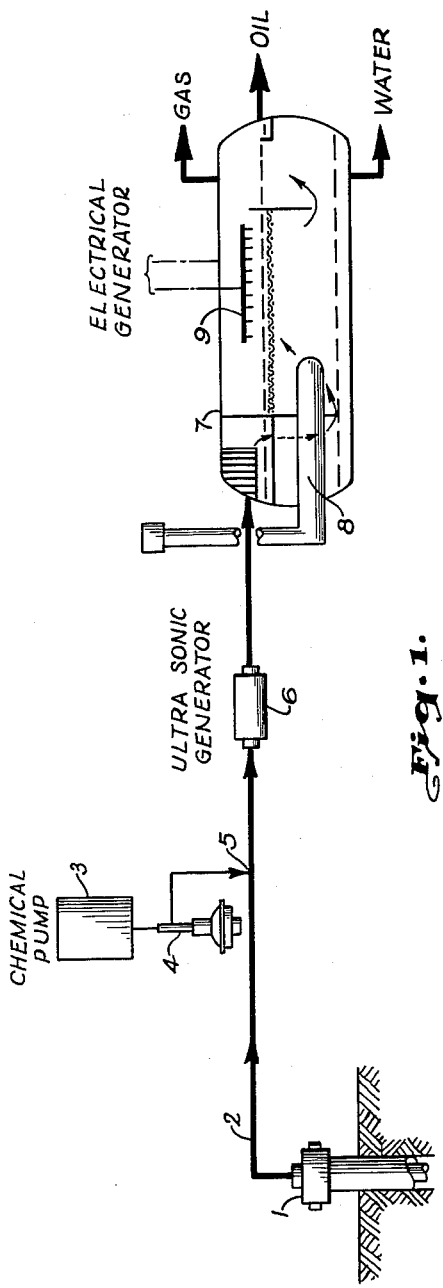
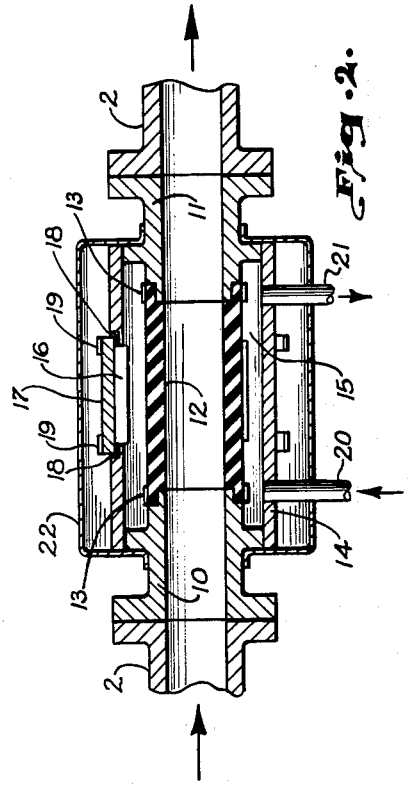

INVENTORS
JAY P. WALKER
CLARENCE O. GLASGOW
ALEX W. FRANCIS JR.
BY
ATTORNEY

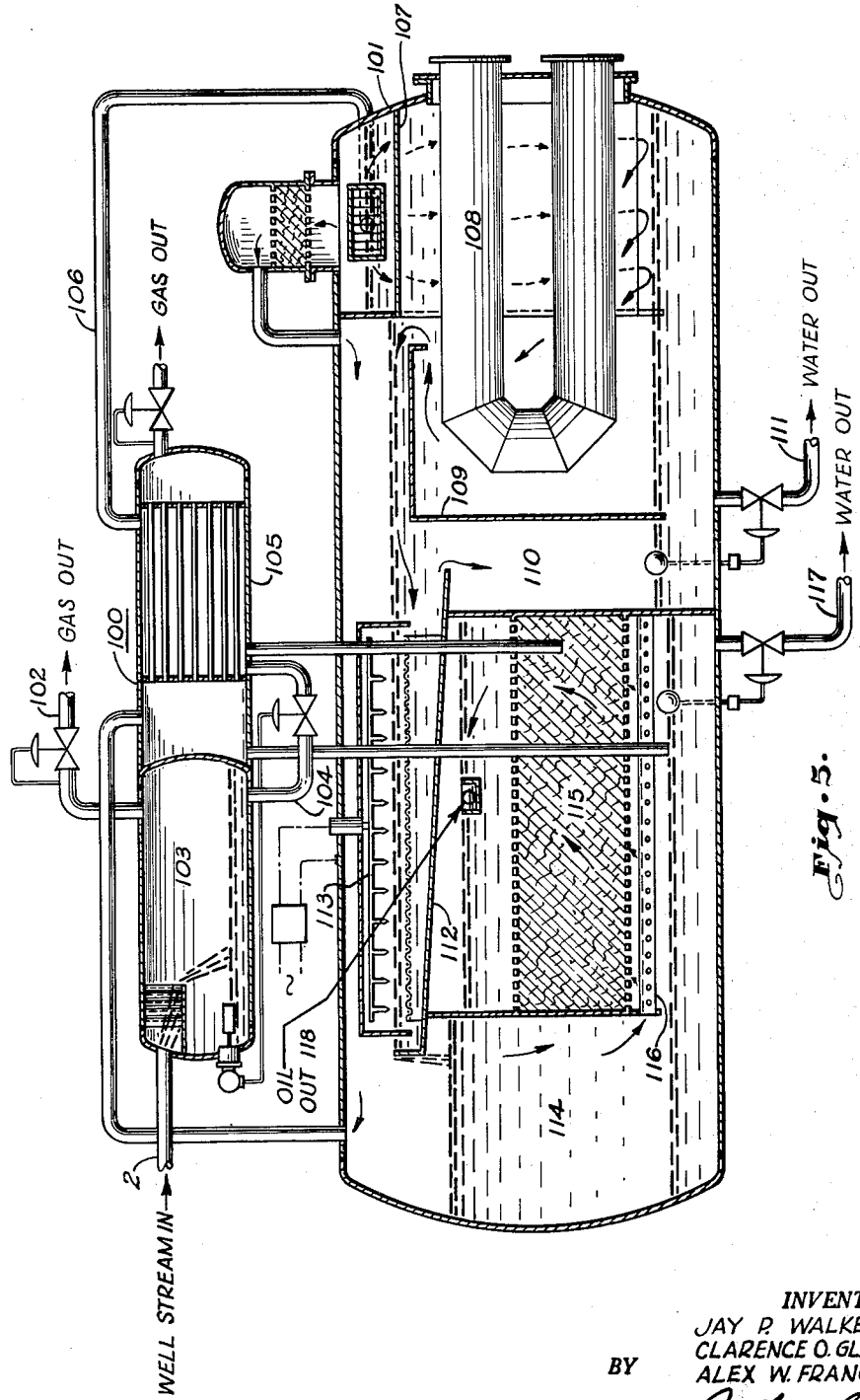

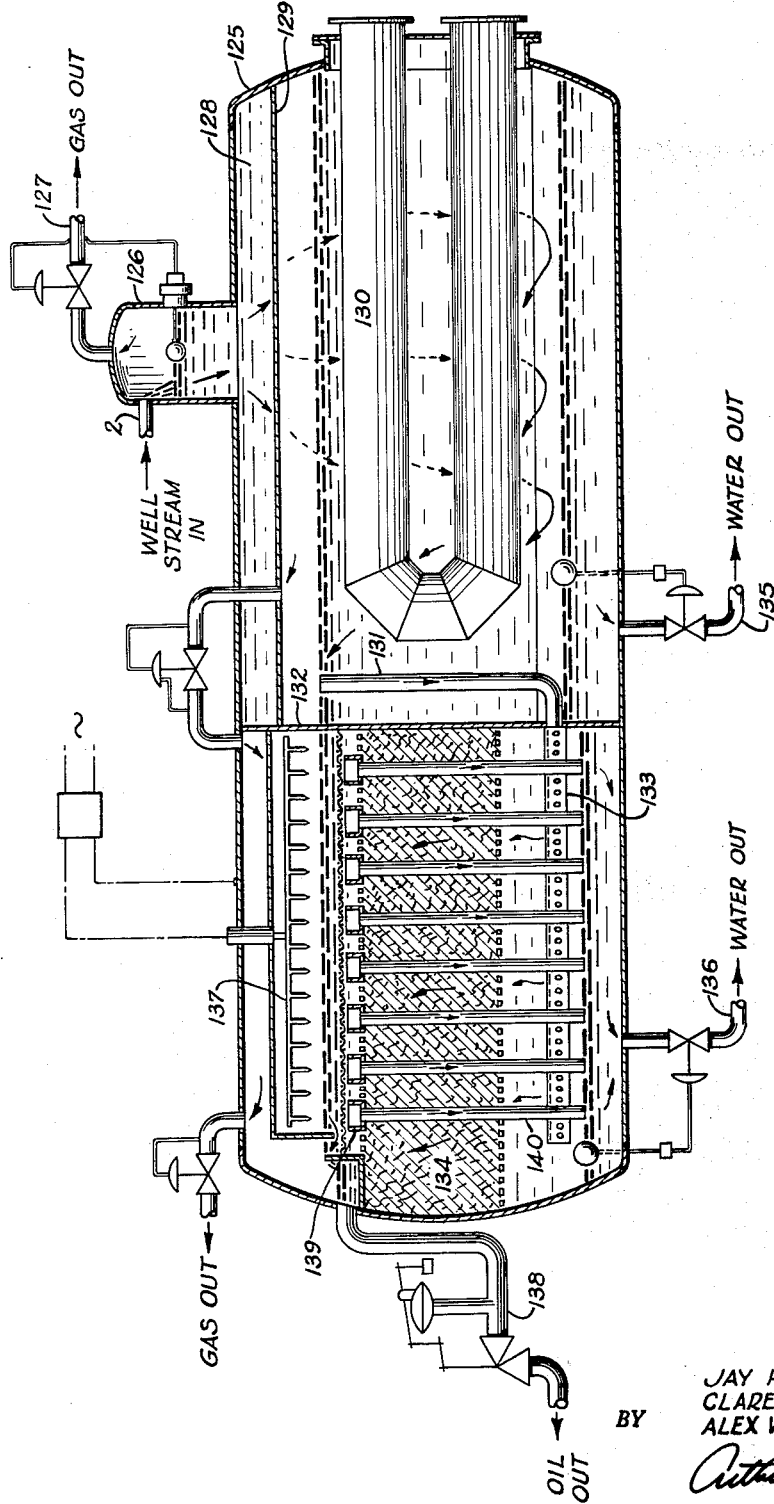

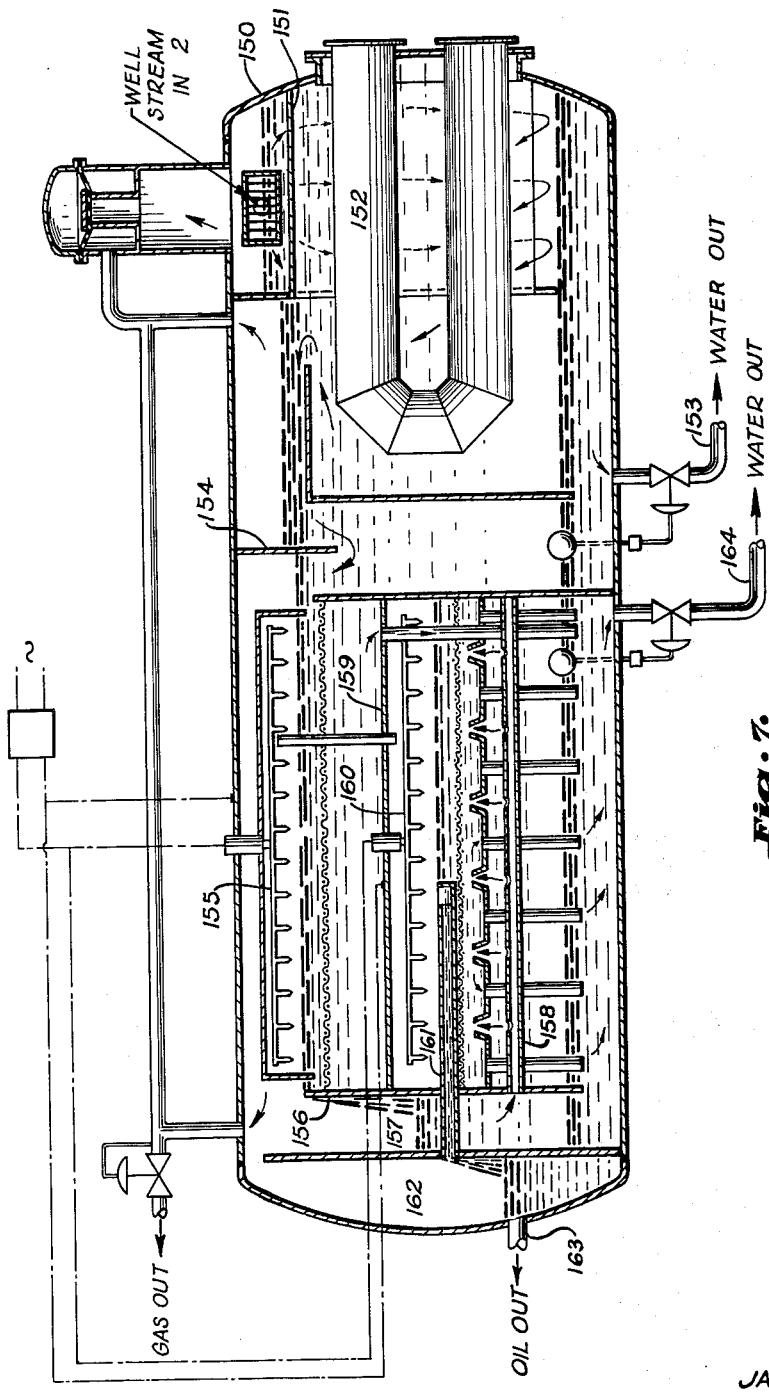

United States Patent Office 3,255,571
Patented June 14, 1966

3,255,571
METHOD AND MEANS FOR TREATING OIL
WELL EMULSIONS
Jay P. Walker, Clarence O. Glasgow, and Alex W. Francis, Jr., Tulsa, Okla., assignors to National Tank Company, Tulsa, Okla., a corporation of Nevada
Continuation of application Ser. No. 67,370, Nov. 4, 1960. This application May 14, 1963, Ser. No. 281,080
10 Claims. (Cl. 55—9)

This is a continuation of Ser. No. 67,370 filed Nov. 4, 1960, now abandoned.

The present invention relates to method and means for dividing oil well production into its various liquid and gaseous phases. More particularly, the invention relates to method and means for utilizing gravitational, centrifugal, heat and electrical forces, in combination with selected residence periods, to separate the various fluids of oil well production.

When the production of an oil well is brought to the surface, its oil, water and gas are bound together in varying degrees of homogeneity. It is well known that this mixture of gas, oil and water during their simultaneous production is most usually the cause of loose or severe emulsions. Also, the viscosity of the oil may affect the severity or tightness of emulsions.

In many instances the mixture of gas, oil and unstable waters has deleterious results on above ground vessels, pipes and facilities. Early removal and disposal of corrosive waters or gases or other unstable products is of prime importance.

Additionally, it is most economical to separate these fluids close to the well head. The merchantable oil and gas must be transported great distances, and it is desirable that the expense of transportation not be increased by the concomitant transport of waste portions of the production. Also, it is desirable to apply these separating forces to the production before the emulsion has had time to become stable with age. Therefore, for these and additional reasons, it is desirable to provide for field processing a stream of crude petroleum containing water and emulsified oil and free gas in the field where it is produced.

There are various chemicals which can be mixed with oil well production to reduce the surface tension of the oil and water. However, economics dictate the limitation on the amount of chemical which can be utilized for this purpose.

Sonic energy is a force which can be applied to oil well production to reduce surface tension. However, the apparatus to produce this energy requires the transduction of electrical power to create the vibrations of sonic energy. The complication of such equipment, its power and application problems, are limitations.

The use of heat is well known as an aid in breaking the bond between oil and water of a production stream. However, heat is expensive and is therefore limited quantitatively. Additionally, gas is specifically becoming more expensive and may not even be available as a source of fuel. Therefore, the use of heat also has its limitations in the treating of oil well production streams.

The use of centrifugal and gravitational forces is also well known. If oil well production is permitted to stand in a container for a long enough period, many types of productions will permit the water to settle from the oil by gravity. Additionally, in many forms of field processing equipment, the flow of production may be diverted and the centrifugal force so generated, applied to remove much water from the flow stream. In connection with the use of centrifugal force, it should be appreciated that the removal of gas from the flowing well stream will facilitate the use of centrifugal force in removing water from the flow stream.

There is also a history of attempts to utilize electrical force to resolve the phases of oil well production streams. Both completely immersed electrodes as well as silent electrical discharge, or corona wind, have been applied to oil well production to result in coalescence of water from the production.

Further, it is fundamental that if residence periods are provided after any emulsion-force is applied to a well stream, the natural forces will cause the oil to collect upwards and the water to collect downwards. Therefore, whenever feasible it is highly desirable to utilize this inexpensive agent for fluid separation.

With all the various processes and techniques enumerated above, there has been no comprehensive attempt to bring all these forces into play for processing oil well production. There is need for an orderly application of these forces with a unified method and apparatus for efficient and economical resolution of the production into its various phases.

A principal object of the present invention is to apply combinations of heat, centrifugal, electrical and gravitational forces to the separation of the phases of oil well production.

The present invention contemplates field processing oil well production by first confining the stream of petroleum while it is heated so gas and free water will release from the stream into a gas-space above the liquids and then passing the liquids downwardly on the outside of a partition of inverted U shape. Oil and emulsion of the liquids are then distributed between the lower end of the U shaped partition and the level of the water below the partition so the oil and emulsion will flow upward, inside the partition, and evolve additional gas and prepare the emulsion for coalescing the oil and water separately. The oil and emulsion are then provided with a large surface area for evolved gas to readily release from the liquids and the liquids then exposed to an electrical force which will coalesce the oil and water into separate bodies.

Other objects, advantages and features of this invention will become apparent to one skilled in the art upon consideration of the written specification, appended claims, and attached drawings, wherein:

FIG. 1 is a schematic illustration of the flow of well production through apparatus field processing the production in accordance with the present invention;

FIG. 2 is a vertical section of the ultra sonic generator indicated as included in the system of FIG. 1;

FIGS. 4–7 are each vertical sections of alternate forms of treaters for use in the FIG. 1 system.

GENERAL SYSTEM

Figure 3:
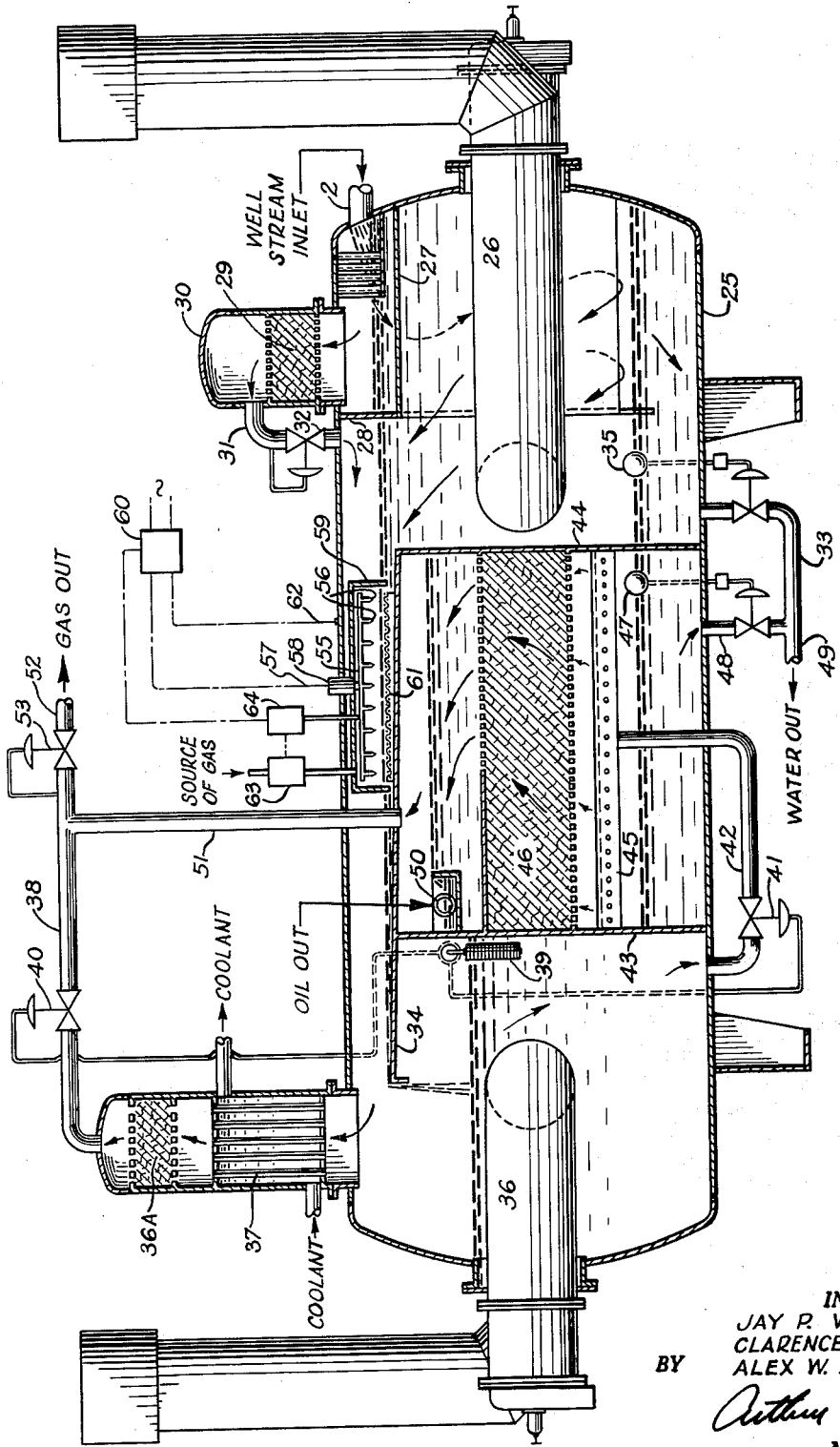
FIG. 3 is a vertical section of one form of treater for use in the system of FIG. 1.

The present invention relates to the processing of well production flowing from wellhead 1. This production is processed to break it into gas, oil and water. As this production is moved along conduit 2, chemical may be added to reduce the surface tension between the oil and water and initiate the processing.

A source of chemical 3 is shown, supplying a pumping mechanism 4. There are several commercially available pumping mechanisms available to remove carefully metered amounts of chemical from source 3 and introduce them into the production at point 5, in conduit 2. There are also many different mechanical structures which may serve to mix the chemical with the production. It is not necessary, however, to show any such structures to illustrate the general fact that chemical may be applied as a force to initiate the separation of the production into its several components.

Ultrasonic energy may be applied to the stream of production in conduit 2. An ultrasonic generator is indicated at 6. The production of conduit 2 flows through generator 6 in order to apply its force to break the production into its various components.

A field processing apparatus is indicated at 7. Within the shell of treater 7 the forces of gravitation, electrical energy and heat may be applied in several different ways. From this treater 7 flows gas, oil and water as the components of the well stream in conduit 2.

ULTRASONIC GENERATOR

Chemical source 3 and pump 4 may have one of a number of common commercial forms. However, the ultrasonic generator 6 has not been commercially exploited to any great extent. At FIG. 2, we have illustrated the essential elements of one form of this apparatus which is suitable to apply ultrasonic energy to the well production. This disclosure follows the structure of Patent 2,864,502.

The electroacoustic, or ultrasonic, transducer 6 comprises tubular end portions 10 and 11. Tubular end portions 10 and 11 have pipe coupling flanges with which they may be included in conduit 2. Obviously, these flanges may be joined to flanges of conduit 2 by detachable bolts not shown. The flow line between tubular portions 10 and 11 is completed by a rubber window 12.

Rubber window 12 may be of "neoprene" or other material of proper acoustic impedance to permit sound of any frequency to pass through it without reflective loss and with relatively little attenuation. This rubber element is tubular in form and has reduced ends secured to the adjacent reduced ends of tubes 10 and 11 by clamping bands 13.

The passageways through the portions 10 and 11 and the rubber window 12 are preferably of the same diameter as the flow passageway in conduit 2. A tubular supporting frame or casing 14 is mounted upon the outer peripheral surfaces of flanges 10 and 11. The latter are positioned about midway externally upon each of the tubular connections 10 and 11, and the casing 14 is preferably welded to these flanges. This arrangement provides a coolant flow space 15 surrounding the rubber window 12 and extending between flanges 10 and 11.

The tubular casing 14 is preferably provided with an annular series of relatively spaced openings 16 at a number of zones around the casing 14, each of which receives, in liquid sealed relation therein, transducer elements or vibrating elements 17. One annular series of these transducer elements is shown, but more may be provided if necessary. Also, in each of the series, three of the transducer elements are contemplated. This number may vary.

The transducer elements 17 are arcuate in shape and mounted in the openings 16 in sealed relation upon resilient cushions 18 of a cork-neoprene composition. The central point of the radius from which the arc or circle in which the transducer elements lie, is located in the axis line of the passageway through the rubber window 12. The arcs of the inner and outer surfaces of each transducer element are both struck from radii having the axis of the window as a center. Annular clamping bands 19 may be provided to hold the transducer elements in place adjacent each of the resilient cushions 18. An electrically conductive conductor, not shown, brings electrical energy transmission to the surface electrodes of the transducer elements 17.

The vibrating elements 17 are of barium titanate, although other thickness expanders may be used. Preferably they have a thickness mode resonance of approximately 200 kc. They are coated inside and outside with silver electrodes, and as before stated, shaped so that the focus of radiated sound lies in the axis of the passageway through rubber window 12. They are capable of handling power to the extent that the sound intensity at the focus is approximately 160 db above 1 dyne per square centimeter.

The coolant space 15 is preferably provided with an inlet line 20 and an outlet 21. The coolant flows continuously and may be water or light oil, such as castor oil. This coolant serves as a sonic vibrating conducting medium between the surface of the transducer elements and the rubber window 12.

A removable dust excluding cover 22 may be employed to enclose the tubular frame 14 and transducer elements 17. The transducer elements 17 are air-backed, in order to provide a reflective boundary, that is, a backing whose acoustic impedance differs materially from that of the vibrating element. This causes the energy which would normally be radiated from the outer surface of the transducer elements to be reflected back into the cylindrical rubber window. The focal area within the window 12 exhibits cavitation in a cylindrical section of about one inch in diameter. This comprises a sectional area appreciably less than the total sectional area of the passageway through the rubber window. As a result of such cavitation, water vapor in the oil is released in free bubble form.

The vibrating means may be attained by magnetostriction or even by mechanical vibrating generators. We are not limited to particular frequencies, although roughly the results desired are attainable by frequencies from 200 kc. to 400 kc. If lower and higher frequencies of vibration are desired, we may use other vibrating means than that described. The sound intensity at the focus must be above the cavitational level.

In connection with the electric power needed for excitement of the transducer elements 17, the source of high frequency electrical power may be attached to the conducting connector, not shown. In one model, a power level of approximately 1 kw. was reported.

Without being restricted to the theory of operation involved in breaking down the hydrocarbon emulsions, it appears that water appears in two forms, in such emulsions, to wit, free water and water vapor. Small but finite drops of free water are dispersed in the oil, apparently being trapped by surface tension. Sonic vibration will readily remove or separate both types of water from oil.

The production in conduit 2, after being mixed with chemical at point 5 and subjected to the ultrasonic energy of generator 6, is taken into treater 7. In treater 7 the forces of gravitation, heat and electrical energy are applied in various ways. The flow path of the production is generally indicated as downward and then upward, to throw water from the production. A heat source 8 is indicated as well as an electrical apparatus 9, positioned within the shell of treater 7 to subject the well stream to their forces. Subsequent figures illustrate various forms and positions for these structures within the shell of treater 7. Whatever, the more specific forms given these structures, their forces produce the indicated gas, oil and water from the production of well head 1.

FIGURE 3 HEAT TREATER

The apparatus of FIG. 3 is generally designated as heat treater 25. Treater 25 is a specific form for the generalized structure indicated at 7 in FIG. 1.

*General flow pattern.*—The well production of conduit 2 is brought into the shell of treater 25 and flowed around a first source of heat represented by firetube 26. Shell 27 which is U-shaped and partition 28 form an annular chamber around firetube 26 for flowing the production of conduit 2 downwardly. The shell 27 terminates short of the bottom of the treater, releasing the well stream so the light components will flow upwardly and directly over the firetube 26. Water, as a heavier component, is thrown downwardly into a layer beneath firetube 26.

The well stream production flowing over shell 27 will have gaseous components evolved therefrom. These gaseous components will pass up through mist extractor 29 and into the top of dome 30. From the top of dome 30, the gas will be conducted through 31, back into the shell of treater 25 on the downstream side of partition 28. It is contemplated that valve 32 will hold a slightly higher pressure in dome 30 than in that part of treater 25 beyond partition 28. The water falling to the bottom of the first heating compartment will be drawn off through conduit 33, valved under the control of an interface float 35.

Along the top of the shell of treater 25 an elongated horizontal path is provided by partition 34. As the oil and emulsion and production flows from around heater 26, up along the elongated path above partition 34, it is spread into a stream from which gas continues to evolve. The partition 34 is slanted back toward the first heating compartment of firetube 26 in order that water developed from the stream will fall back into the collection being drawn off through conduit 33 under the control of float 35. At this point, in this elongated path, it is convenient to apply electrical force in developing more water from the oil.

The well stream in the elongated path flows into a second heating compartment where the heat of firetube 36 applies additional heat to help break the bond between oil and water of the emulsion. Thermal currents are developed in this compartment by heat source 36 to cause further mixing of chemical in the well stream and to bring the well stream up to a temperature which will thoroughly prepare it for coalescence of the oil and water.

Gas evolved in the elongated path, and in this second heating compartment of firetube 36 is carried up through mist extractor 36A, heat exchanger 37, and is drawn off by conduit 38. It is contemplated that the heat exchanger 37 will utilize any available cooling medium to reduce the temperature of the evolved gases so liquefiable hydrocarbon components and water will be developed to fall back into the second heating compartment.

The level of all these liquids in the second heating compartment is sensed by float 39. Float 39 controls gas valve 40 in conduit 38 and valve 41 in conduit 42 to develop a differential gas pressure and head between the second heating compartment and a final, coalescing chamber which will move the liquids from the second heating compartment.

All of the liquids are moved out of the second heating compartment, through conduit 42 and into the coalescing chamber formed between partitions 43 and 44, centrally located within the shell of treater 25. Within this coalescing chamber, the liquids from the second heating compartment are distributed by a spreader 45 receiving the liquids from conduit 42. The liquids properly prepared for coalescence by all the forces applied to the well stream, enter the coalescing section 46 of the chamber in which the oil agglomerates into a clean body of oil above the section 46 and water agglomerates into a body below the spreader.

An interface float 47 controls the discharge of water from the body in the lower part of the coalescing chamber, through conduit 48. The water from conduit 48 joins the water of conduit 33 in conduit 49 for disposal. The clean oil collecting above the coalescing section 46 is skimmed into oil outlet conduit 50 as a storageable, marketable product of the well stream.

As the clean oil in the coalescing chamber evolves gas, due to its elevated temperature, this gas is drawn off by conduit 51 to join the gas of conduit 38 in conduit 52. Back pressure valve 53 establishes the gas pressure above the clean oil in the coalescing chamber.

*Electrical force.*—In the shell 25 of the FIG. 3 treater, an electrical force is applied to the well production passing through the treater as an additional force to separate the production to its component phases. In FIG. 3, we have selected the elongated passage for the liquids out of the first heated compartment as a location for applying the electrical force to the production. Over partition 34, the liquids flow in a relatively shallow stream. The present invention provides a Corona Wind discharge with which to bombard the surface of the liquid emulsion as an aid in rupturing the emulsion. The water broken from the emulsion then falls along the incline of the plane in which partition 34 extends or is carried along with the other liquids of the production through the second heated compartment, conduit 42 and into the bottom of the coalescing compartment, to be eventually withdrawn through conduit 48.

It is feasible to apply the electrical discharge developed between two electrodes which are compltely immersed in the body of emulsion. An electrical force applied in this manner will carry out objects of the invention in combination with the other forces being applied to the emulsion. However, in FIG. 3 there is illustrated an apparatus in which the discharge electrodes are not immersed in the body of emulsion, but are spaced with electrodes above the surface of the emulsion.

It has been found that by generating a Corona Wind discharge by an electrode placed above the liquid surface, and bombarding the surface of these production liquids flowing along partition 34 with this Corona Wind, substantially all the water can be coalesced and agglomerated and caused to settle rapidly from emulsion without giving rise to the re-emulsification phenomenon and short-circuiting encountered when the discharge electrodes are immersed in the liquids. With this form of electrical apparatus, there is less limitation placed on the amount of voltage employed and on the spacing of the discharge electrode structure from the oppositely-charged submerged electrode than is the case when the discharge electrode is immersed in the emulsion.

Corona Wind discharge from an electrode, especially from a pointed electrode, is well known and is sometimes referred to as a silent discharge. It occurs when gas adjacent the point of the discharge electrode connected to a high voltage source becomes charged similarly to that of the discharge electrode. Because the charged gas particles are of the same charge as the electrode, they are repelled away from it, thus setting up a current of charged gas referred to as the Corona Wind.

In accordance with the present invention, the Corona Wind is directed into the surface of the oil-water emulsion whereby the charged gas molecules, upon impinging with the surface of the emulsion, give up their charge to water particles at the surface of the emulsion. The charged water particles thereupon migrate toward the submerged electrode with a charge opposite to that of the discharge electrode and, upon reaching the electrode, lose their charge and coalesce and agglomerate with each other, and with other droplets passing the electrode at that point, into larger drops which readily settle out.

Some of the coalesced water drops pass out from under the discharge electrode structure in the normal flow of liquid over the partition 34. They are of such nature as to settle out afterward in the coalescing section. Bombarding of the surface of the liquids by the Corona Wind causes agitation of the surface, but this agitation is of a type different from that occasioned when the electrode is immersed in the emulsion and does not normally cause re-emulsification. It is immaterial whether the discharge electrode structure is charged positively or negatively so long as the submerged electrode in the liquids is of the opposite charge.

Referring more specifically to FIG. 3, there is located above partition 34 an electrode assembly 55 comprising pointed electrodes 56. The electrodes 56 are electrically connected together and to the electrical connection 57, indicated as entering the vessel through an insulating bushing 58. The electrode assembly 55, which is supported from above, is essentially made up of a conducting metal plate to form the common electrical connection between the electrodes 56. Some form of insulating material may be applied around the periphery of the plate to prevent discharge from the edge of the plate.

The pointed electrodes 56 are positioned above the liquid level maintained on partition 34, and the axis of the assembly is substantially normal to the liquid level so as to discharge the Corona Wind downwardly onto the liquid surface. The plane of the points is substantially parallel to the liquid level.

Over discharge electrode assembly 55 is a hood 59, with walls extending below the surface of liquid flowing over the partition 34. Hood 59 is preferably of a non-conducting material such as synthetic resin. This hood, in conjunction with the level of the liquids, forms a gas-liquid seal maintaining a desired gas atmosphere in the space occupied by discharge electrode assembly 55 and between electrodes 56 and the liquid level. The discharge assembly 55 is connected, by electrical conductor 57, to a source of high voltage direct current 60.

Positioned slightly below the liquid level on partition 34 is screen 61. Screen 61 may be made crossing conducting wires or other conducting grid-like structure such as will be provided by a perforated conducting metal sheet or crossing wires or rods, or the like, the important feature being that it presents a large electrode surface relative to volume while permitting liquid to pass freely therethrough and thereover.

The electrode, however, need not be in the screen form 61, but may be the partition 34 itself under some circumstances.

As shown in FIG. 3, screen 61 does not extend entirely over the partition 34, but terminates substantially at the bounds of discharge electrode assembly 55. By virtue of the electrical attachment 62, the shell of treater 25 and screen 61 is charged oppositely that of discharge electrode assembly 55. The vessel 25 is in turn grounded when discharge electrode assembly 55 is positive.

Should it be desired to operate under a substantially oxygen-free atmosphere, air may be evacuated from within hood 59 and replaced by a desired gas which may be hydrocarbon gases contained in the incoming well production. The presence of the gas atmosphere under hood 59 can be controlled from a source 63. The composition of the gas under hood 59 may be constantly, or intermittently, sampled by sampler 64. As indicated, the detector-sampler 64 may control source 63, or turn off the voltage source 60, if the gaseous constituents under hood 59 develop into a dangerous composition.

The number of pointed discharge electrodes per unit of area, along with the voltage employed, determines the intensity of the Corona Wind discharge. The pointed electrodes may be as closely spaced as about ¼ inch on center. The exact spacing between electrodes may be determined by the variable factors of voltage, distance between pointed electrodes and the surface of the liquids being subjected to the Corona Wind, conductivity of the liquid being treated and nature of the gaseous atmosphere. The pointed electrodes may be as far apart as 3 to 4 inches on center, or greater. Pointed discharge electrodes will be in the form of needles, spikes, and the like, and are preferably made of high temperature resistant metal like tungsten or stainless steel, although many conducting metals may be employed, particularly where a non-oxygen-containing atmosphere is used.

Reference has been made above to operating under an atmosphere of substantially oxygen-free gas. This is recommended when working with emulsions containing combustible gases, such as combustile hydrocarbon gases in petroleum emulsions, to avoid explosions. In this connection, a petroleum emulsion containing volatile hydrocarbon gases may provide its own oxygen-free atmosphere by permitting the gases escaping from the emulsion to displace the air under the hood 59.

FIGURE 4 HEAT TREATER

Figure 4:
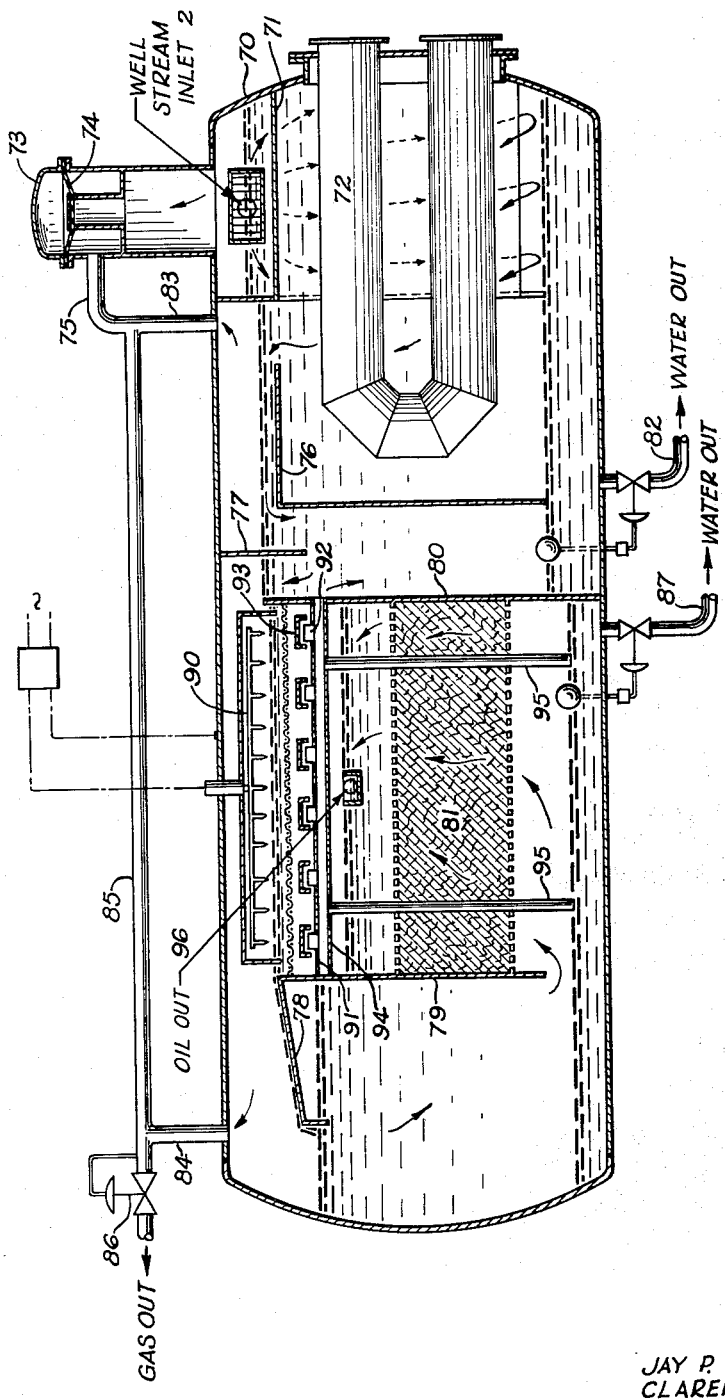

Another form of treater to carry out the functions indicated, in connection with FIG. 1, is shown in FIG. 4. The connection of shell 70 to conduit 2, is indicated, the well production being received and resolved into its gas, oil and water components.

*General flow pattern.*—There is a general similarity to the FIG. 3 arrangement, the production is caused to flow downwardly over a hood 71 and then upwardly under the hood 71 and over heat source 72. Gas released from the production, and evolved, is passed into dome 73, through valve 74 and out conduit 75.

After release beneath firetube 72, the liquids of the production flow upwardly and over a horizontal partition 76, under a vertical baffle 77 and into a Corona Wind unit. From the Corona Wind unit, the production flows down along a shelf 78 and into an end zone of the treater shell. Between this end zone and the heating zone are vertical partitions 79 and 80 between which a coalescing structure 81 is contained. The water developed in the compartment in which heat source 72 is mounted is withdrawn through conduit 82. The gas developed in this compartment is discharged through conduit 83. The gas developed in the section of the shell beyond vertical baffle 77 is drawn up through conduit 84.

The gas of conduits 75, 83 and 84 are joined in conduit 85. A back pressure valve 86 holds a predetermined pressure on the shell of treater 70.

The water developed beyond vertical partition 77 is collected in a body withdrawn through conduit 87. The water developed in this part of the treater results from the agglomerating carried out by structure 81 and the Corona Wind force.

*Corona Wind unit.*—The liquids flowing from beneath vertical partition 77 and over top of partition 80 enter a Corona Wind unit 90, similar to the unit disclosed in FIG. 3. However, Corona Wind unit 90 is placed in the shell of treater 70 so the water it develops from the well stream will be dropped directly below coalescing structure 81 for discharge through conduit 87.

In other respects, Corona Wind unit 90 is basically similar to the FIG. 3 disclosure. A fixture of pointed electrodes is located above the surface of liquids flowing from the heat treatment. A hood is indicated as useful and maintaining the desired gaseous atmosphere around these electrodes. A source of gas for this hood, and a detector of the gas composition, may be included. However, a further duplication of description is deemed unnecessary in connection as the structure was developed thoroughly in connection with FIG. 3. Beneath the screen-electrode under the surface of liquids exposed to the Corona Wind, is a tray-partition 91. Numerous upstanding vertical conduits 92 are shown, mounted through tray 91. Over each of these conduits is mounted a cap 93. The function of this arrangement is to collect water developed by the Corona Wind unit 90 on the floor proper of tray 91 to a level which will discharge the water down conduits 92 onto collecting tray 94. From tray 94, the developed water is precipitated to the bottom of the shell by conduits 95. This arrangement, therefore, provides direct removal of water from the Corona Wind unit 90 to discharge conduit 87. Any water not removed by the unit and carried off through conduits 95 will be carried along with the liquids of the production into the end compartment of the treater. As these liquids reverse their direction of flow upward into coalescing structure 81, gravity will function to cause the water to fall out into the bottom of the shell for removal through conduit 87.

The clean oil is developed above the coalescing structure 81 indicated in the chamber between partitions 79 and 80 for removal through conduit 96. Therefore, all the forces of heat, gravity and the electrical Corona Wind unit are brought into play on the production. In a general sense the FIG. 4 treater functions as the treater of FIG. 3. However, there the specific structural arrangements of FIG. 4 have an advantage of simplicity while carrying out these broad objects of the invention.

FIGURE 5 HEAT TREATER

Another form of treater to carry out the functions indicated, in connection with FIG. 1, is shown in FIG. 5. Conduit 2 is shown bringing the well production into a separator-heat exchanger 100. Some of the free gas is separated from the well stream and the remaining liquids are passed into treater shell 101 where the well production is recevied and resolved into its gas, oil and water components.

*General flow pattern.*—It is obvious, from the disclosure of separator-heat exchanger 100, there is a general similarity to the preceding arrangements of FIGS. 3 and 4. Additionally, in the separator-heat exchanger 100, the well stream of conduit 2 has its free gas removed through a conduit 102, controlled by a back pressure valve. The level of liquids in separator section 103 are sensed by a float and valved through conduit 104 and into heat exchanger section 105. From heat exchanger 105, the liquids are passed through conduit 106 and into the shell of treater 101. Within the shell of treater 101, the liquids are passed over a hood 107 released near the bottom of this first compartment and passed up directly over firetube 108.

A baffling partition 109 causes the liquids to flow from over firetube 108 along a short horizontal, elongated, path. Water developed by the application of heat, and not released from the emulsion in the first compartment, next has an opportunity to drop downwardly through compartment 110 to join the water of the first compartment for valving into conduit 111. The remaining liquids of the production flow over partition 112, beneath a Corona Wind unit 113 and into the end compartment 114 of the treater shell.

The liquids falling into the compartment 114 are distributed beneath of coalescing structure 115 by spreader 116. The water which continues to develop in compartment 114 has an opportunity to fall to the bottom of the treater shell for removal through conduit 117. The remainder of the liquids, having been exposed to the forces of gravity, heat and the Corona Wind unit are given their opportunity to agglomerate into oil and water within the coalescing structure 115. The clean oil is formed into a body above the structure and flows from the treater shell out conduit 118. The water, of course, falls into the bottom of the treater and is removed through conduit 117.

*Corona Wind unit.*—Corona Wind unit 113 is, again, similar to the units disclosed in FIGS. 3 and 4. Corona Wind unit 113 is shown with the characteristic series of pointed electrodes above the surface of liquid flowing from the heated compartment of firetube 108. A screen is shown in position as the immersed electrode beneath the surface of the liquids. A hood is also shown about the electrodes and over the surface of the liquids to indicate control of the gaseous atmosphere about the electrodes as desired. A voltage source is indicated, but a source of special gas for control of the atmosphere within the hood, and a sampler-controller is not shown as needless duplication of the foregoing disclosure of FIGS. 3 and 4.

The partition 112 is shown at a material degree of slant, back toward the heating compartment of firetube 108. Water developed by the Corona Wind unit 113 is expected to largely slide back along this slanted partition 112 and fall into the bottom of the heating compartment for removal through conduit 111. Therefore, the opportunity for re-emulsification of the water developed by unit 113 is not likely to occur by moving such developed water back toward the source of liquids flowing into unit 113. If water is carried along the production, it is expected to fall into compartment 114 and be removed from the bottom of the treater through conduit 117.

FIGURE 6 HEAT TREATER

Still another form of treater to carry out the function indicated, in connection with FIG. 1, is shown in FIG. 6. In general, the Corona Wind unit utilized in connection with this treater, is placed above a coalescing structure as a final force applied to the liquids of the well stream to reduce the water content and the clean oil developed as an ultimate product.

*General flow pattern.*—There is a general similarity to the arrangement to the preceding treater disclosure. However, there are significant differences. The production is caused to flow into the shell of treater 125 by way of conduit 2. More specifically, conduit 2 flows the production into a dome 126. The liquid level in dome 126 is float-controlled by manipulating a valve in gas conduit 127 controlling free gas developed in dome 126.

By control of liquid level in dome 126, an annular space 128 is maintained liquid-packed between the shell of treater 125 and hood 129. The liquids are moved down through space 128 and released near the bottom of the compartment to flow upward directly over firetube 130.

A siphon-conduit 131 draws all liquids heat-treated by firetube 130 through vertical partition 132. The spreader structure 133 distributes the heat-treated liquids beneath the coalescing structure 134.

It is contemplated that water developed in the heated compartment, by heat from firetube 130, will form a body in the lower part of the shell which will be removed through conduit 135. The water developed from the production liquids beyond partition 132 also gravitates toward the bottom of a shell for removal through conduit 136. Therefore, it is contemplated that majority of the water will be developed by the forces applied to the production stream as it flows through conduit 2 and the gravitation, heat and agglomeration applied within the shell of treater 125. However, it is recognized that these forces may need supplementing by a Corona Wind unit.

*Corona Wind unit.*—Corona Wind unit 137 is placed above the liquid flowing upward from the coalescing structure 134, prior to being skimmed off for discharge through conduits 138. All the now-familiar components of the Corona Wind unit are disclosed in FIG. 6. Beneath the screen electrode there has been placed a series of cups 139 mounted on the top of downcomer pipes 140. The arrangement provides for water developed at the screen-electrode to fall into cups 139 and flow directly downward to the bottom of the treater shell for removal through conduit 136.

FIGURE 7 HEAT TREATER

The final form of treater to carry out the functions indicated, in connection with FIG. 1, is shown in FIG. 7. The general arrangement of this treater structure may be compared with treater 70 of FIG. 4.

*General flow pattern.*—The well stream is brought into the shell 150 in the same fashion as it was brought into shell 70 in FIG. 4. The liquids flow downwardly over hood 151 and are released to flow upwardly over firetube 152. Water is removed through conduit 153 and is removed in precisely the same manner as in the FIG. 4 arrangement. The liquids flow over a short elongated horizontal path, under vertical baffle 154 and into a first Corona Wind unit 155.

Corona Wind unit 155 is a first of two Corona Wind units utilized within the shell of treater 150. The liquids flowing from beneath the hood of unit 155 flow over partition 156 and into a compartment 157. From compartment 157, the liquids flow into spreader 158. From spreader 158 the liquids flow into a compartment beneath horizontal baffle 159 and beneath which baffle a second Corona Wind unit 160 applies its force prior to the clean oil being drawn off through conduit 161 into compartment 162. From compartment 162 the clean oil is discharged through conduit 163 as the utimate product of the treater.

The water collected on the bottom of shell of treater 150 is discharged through conduit 164. The gas developed in the various compartments of the treater are collected and discharged in precisely the manner disclosed and described in connection with FIG. 4.

*Corona Wind units.*—Corona Wind units 155 and 160 illustrate the possible usage of a plurality of units both of which are similar to those heretofore disclosed, including hoods, screen-electrodes and sources of electrical power. Again, the inclusion of a source of gas, together with a means for detecting and controlling such source, are not included as needless duplications in view of the prior disclosure.

In general, first Corona Wind unit 155 is located at a point in the flow pattern of the production intermediate the heat treating and the coalescing structure of a treater. This disclosure of FIG. 7 recognizes the desirability of applying this Corona Wind force in stages. Second, Corona Wind unit 160 is placed over the final coalescing structure of the treater, beneath horizontal partition 159. The water developed beneath each Corona Wind unit is conducted directly to the bottom of the treater shell for removal through conduits 164.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method for processing oil well emulsion including,
   introducing a stream of petroleum into a first confined and heated zone to further the release of gas and free water from the stream, passing the liquid mixture downwardly and then upwardly to utilize the force of gravity as an additional force to release additional free water developed in the mixture,
   further heating the liquid mixture from the first confined zone as a force applied to reduce the viscosity of the emulsion and break the emulsion, and release additional gas from the stream,
   passing the liquids over a first elongated horizontal path to release additional gas from the heated liquids,
   passing the liquid mixture downwardly again and then upwardly to utilize the force of gravity to release additional free water developed in the mixture,
   removing the free water released from both changes in flow direction,
   and flowing the liquid mixture into a second confined zone between two electrodes to expose the mixture to an electrical force of magnitude sufficient to coalesce the water of the broken emulsion.

2. An emulsion treater including,
   a vessel shell,
   an inlet connected to the shell for oil well production to be processed,
   a source of heat mounted within the shell,
   a hood mounted about the heat source and positioned below the production inlet to form a jacket-chamber about the heat source between the heat source and the wall of the shell through which the production flows downwardly and is heated to further the release of gas and free water and from which the production liquid flows upwardly about the heat source to additionally heat the liquid and release additional gas,
   a passage from the hood along which the stream is caused to flow,
   a baffle at the end of the passage which causes the stream to flow downwardly and then upwardly to utilize the force of gravity to release water developed in the stream,
   means for removing free water from below the hood and baffle,
   a passage from the baffle along which the stream is caused to flow,
   two electrodes arranged in the passage to establish an electrical force between them and onto the stream flowing along the passage,
   a source of high voltage connected to the electrodes,
   a compartment of the shell connected to the passage arranged to receive the stream of liquids from the passage and in which the oil is coalesced and freed of substantially all water,
   and means for withdrawing oil and water separately from the compartment.

3. The method of treating water emulsified oil well production including,
   releasing an oil well production in a volume to provide a first stage of gas release from the production,
   passing the liquids of the production downwardly in a first confined and heated zone to further the release of gas and free water from the production,
   releasing the liquids of the production from the lower portion of the first confined zone into a body of oil and emulsion heated directly by a source of heat,
   passing the liquids upward and over the heat source to lower the viscosity of the liquids by the direct heating,
   providing a large surficial area of the heated liquids immediately following the direct heating of the liquids from which gas will readily release in a second stage of gas release,
   passing the liquids through a zone of coalescence where the liquids are exposed to an electrical field of magnitude sufficient to coalesce the water,
   providing a large surficial area of the coalesced oil immediately following the coalescence from which gas will readily release in a third stage of gas release,
   removing the gas released from the three stages of gas release,
   and separately removing the degassed oil.

4. A system for field-processing a stream of crude petroleum containing water and emulsified oil and foam including,
   an elongated shell having its axis horizontally extended,
   a first heated compartment in one end of the shell receiving a stream of crude petroleum and providing sufficient residence time within which gas will release from the liquids of the stream in a first stage of degassing and in which the liquids will flow downward,
   a source of heat mounted in a second compartment in the shell and connected to the first compartment at their lower portions, which arrangement provides a path for the liquids to flow upwardly in the second compartment and directly over the source of heat to effectively reduce the viscosity of the liquids,
   a volume in the shell receiving the directly heated liquids which will provide a large area for the surface of the heated liquids from which gas will readily release in a second stage of degassing,
   a third compartment in the shell in which charged electrodes are mounted to receive the liquids degassed in the second stage in order for the oil and water to be separately coalesced by exposure to the electrical field between the electrodes and provide a large area for the surface of the coalesced oil from which gas will readily release in a third stage of degassing,
   and means for separately removing the gas of the three stages and the oil and the water from the shell.

5. The method of treating oil well production containing free water and free gas including,
   passing the production into a first confined zone,
   separating free gas from the production within the confined zone and maintaining a gas space in the upper part of the confined zone, maintaining a level for the liquids of the production below the gas space in the upper part of the confined zone, forming paths downwardly from the upper part of the confined zone and below the level of the liquids on the outer side of a partition in the form of a hood having a cross-section of inverted U shape, said ending at the bottom of the inverted U, passing the liquids of the production downwardly in the paths from their level while heating the liquids with a source of heat mounted within the partition and releasing the gas developed from within the liquids as said liquids pass downwardly while passing the gas vertically upwardly in a substantially straight path to the surface of the liquid level and disengaging the gas from the liquids by passing the released gas vertically upward from the surface of the level into the gas space maintained in the upper part of the confined zone which gas space is entirely contained above the source of heat, collecting water into a body at the bottom of the paths and discharging water from the body to maintain a water level below the paths formed on the outer side of the hood partition, distributing only oil and emulsion of the liquids between the lower ends of the paths and the water level horizontally along the horizontal lengths of the paths, releasing the distributed oil and emulsion from the lower ends of the paths into only oil and emulsion directly heated by the source of heat to evolve additional gas and prepare the emulsion for coalescing the oil and water separately, flowing the directly heated oil and emulsion as a body of fluids provided with a large surface area above and away from the heat source following the direct heating of the oil and emulsion from which surface the additionally evolved gas is readily released from the liquids, passing the liquids through a zone of coalescence between two electrodes to expose the mixture to an electrical force of magnitude sufficient to coalesce the oil and water into separate bodies and migrate the oil upward and the water downward to separate the oil and water, and separately discharging the gas and oil and water from the process.

6. The method of claim 5 including, developing a differential between the force on the liquids in the outer paths and the liquids in the inner paths to force liquids from the outer paths to the inner paths.

7. The method of claim 5 including, passing gas evolved during the process in heat exchange with at least a portion of the production to condense hydrocarbons and return the condensates to the mixture, whereby the gravity of the oil is enhanced.

8. A system for field-processing a stream of crude petroleum containing free water and free gas including, an elongated shell having its axis horizontally extended, a first compartment positioned in one end of the shell and connected to a stream of crude petroleum, a partition mounted within the first compartment and in the form of a hood having a cross-section of inverted U shape elongated along a horizontally extended axis arranged parallel to the horizontally extended axis of the elongated shell to form a first path between the outer surface of the partition and the inner surface of the compartment walls, the lower ends of the legs of the U shaped hood terminating above the bottom of the first compartment, means mounted in the first compartment above the partition-hood at a position where the incoming stream of crude petroleum will impinge thereon and facilitate the separation of free gas from the liquids of the stream, a conduit connected to the upper portion of the first compartment and controlled to withdrawn gas from the top of the first compartment to form a level for the liquids of the production above the first path formed between the partition and walls, means to contain a gas space above said liquid level in the first compartment, a source of heat providing an elongated form and mounted to extend horizontally and parallel with the axis of the shell within the partition-hood to form a second path between the external surface of the heat source and the internal surface of the partition-hood, which second path is connected to the first path at the lower ends of the legs of the hood, the source of heat, the partition-hood and the walls being so constructed and arranged to raise the temperature of the liquids as they flow downwardly in the first path to release gas developed within the liquids to flow vertically upwardly in a substantially straight path to the surface of the liquid level where the gas disengages and passes vertically upward from the surface of the level into the gas space in the upper part of the first compartment, means for maintaining the level of water gravitating to the bottom of the first compartment at a level below the lower ends of the legs of the U shaped hood by discharging water from the production, and distributing only oil and emulsion along the horizontal lower ends of the legs of the U shaped hood and over the surface at the level of water before rising up the second path while directly heating only the oil and emulsion by the source of heat to evolve additional gas, means for establishing a large surface area above and removed from the source of heat for the directly heated oil and emulsion flowing from the second path from which additionally evolved gas is readily released from the liquids, two electrodes arranged downstream from the large surface area to establish an electrical force between them onto the directly heated oil and emulsion, a source of high voltage connected to the electrodes, a second compartment in the shell arranged to receive the liquids from the electrodes and in which the oil and water are separately coalesced, and conduits connected to the compartments of the shell for separate removal of the gas and oil and water.

9. The system of claim 8 including, means for maintaining the force exerted on the surface at the level of liquids in the first path greater than the force exerted on the large surface area of liquids in the second path to force liquid out of the first compartment.

10. The system of claim 8 including, a heat exchanger passing the gas evolved during the process in heat exchange with at least a portion of the producing well stream to condense hydrocarbons from the evolved gas and return the condensates to the mixture, whereby the gravity of the oil is enhanced.

References Cited by the Examiner

UNITED STATES PATENTS

| | | | |
|---|---|---|---|
| Re. 25,504 | 12/1963 | Glasgow | 55—42 |
| 1,109,103 | 9/1914 | Baum | 252—362 |
| 1,465,398 | 8/1923 | Kelley | 252—362 |
| 2,049,561 | 8/1936 | Grave | 55—139 |
| 2,209,798 | 7/1940 | Subkow | 204—188 |

(Other references on following page)

UNITED STATES PATENTS

| | | | |
|---|---|---|---|
| 2,257,997 | 10/1940 | Barnes | 252—349 |
| 2,342,950 | 2/1944 | Lovelady et al. | 252—362 |
| 2,382,253 | 8/1945 | Penney et al. | 55—8 |
| 2,601,904 | 7/1952 | Erwin | 55—174 |
| 2,726,729 | 12/1955 | Williams | 55—174 |
| 2,823,181 | 2/1958 | Packie et al. | 204—302 |
| 2,841,242 | 7/1958 | Hall | 55—5 |
| 2,864,502 | 12/1958 | May | 55—175 |
| 2,868,312 | 1/1959 | Erwin | 55—175 |
| 2,942,689 | 6/1960 | Walker et al. | 55—42 X |
| 2,995,202 | 8/1961 | Glasgow | 55—45 |
| 2,996,188 | 8/1961 | May | 210—123 |
| 3,009,536 | 11/1961 | Glasgow | 55—42 |
| 3,035,445 | 11/1961 | Evans et al. | 55—122 |
| 3,043,072 | 7/1962 | Walker et al. | 55—45 |
| 3,074,870 | 1/1963 | Carswell et al. | 204—312 |
| 3,121,055 | 2/1964 | Carswell | 204—302 |

FOREIGN PATENTS

| | | |
|---|---|---|
| 1,205,610 | 2/1960 | France. |

OTHER REFERENCES

Becker P.: Emulsions—Theory and Practice, Reinhold Publishing Co., New York, 1957, pp. 290–292.

REUBEN FRIEDMAN, *Primary Examiner.*

B. NOZICK, *Assistant Examiner.*